UNITED STATES PATENT OFFICE.

SAMUEL FRIEND, OF DECATUR, ILLINOIS, ASSIGNOR OF THREE-FOURTHS TO JOHN K. WARREN, BRADFORD K. DURFEE, AND DANIEL H. HEILMAN, OF SAME PLACE.

ART OF TREATING CLAY.

SPECIFICATION forming part of Letters Patent No. 385,750, dated July 10, 1888.

Application filed May 25, 1887. Serial No. 239,331. (No specimens.)

*To all whom it may concern:*

Be it known that I, SAMUEL FRIEND, of the city of Decatur, county of Macon, and State of Illinois, have invented certain new and useful Improvements in the Art of Treating Clay Preparatory to Baking or Burning, of which the following is a specification.

It is the object of my invention to enable inferior clays to be used in the manufacture of brick and analogous articles, to insure cohesiveness and density in such articles, and to enable the same to be burned in a kiln immediately after molding without the usual delay and expense of the "water-smoke" process.

I accomplish my object by pulverizing the clay, heating it intensely, and subjecting it while hot to cold water, preferably in the form of spray. Clay so treated is thoroughly and uniformly permeated with moisture, is spongy to the touch and very cohesive, and when burned forms articles of great density and firmness.

The first step of the process is preparatory. The second step expels the moisture, consumes deleterious substances when inferior clay is used, and highly expands the clay and the air retained therein. The third step is based on the difference between the specific heat of the clay and of the air. The air is heated to a given point much sooner than the clay, and when the cold water is applied the air is condensed, while the clay remains comparatively unaffected. The heat extends the interstices of the clay, and when the air contained in the interstices is condensed by the cold water vacuums are formed, into which the water is instantaneously and irresistibly drawn. Clay so prepared, if molded at once, will have sufficient heat to throw off the water-smoke, and the articles so molded may be subjected at once to the burning heat of the kiln.

I claim—

The method of treating clay, consisting of pulverizing, heating intensely, and subjecting while hot to cold water applied directly and practically simultaneously to all the particles, as and for the purpose set forth.

In testimony whereof I sign my name in the presence of two subscribing witnesses.

SAMUEL FRIEND.

Attest:
L. P. GRAHAM,
Z. D. WALKER.